(12) United States Patent
Rossini et al.

(10) Patent No.: US 9,025,095 B2
(45) Date of Patent: May 5, 2015

(54) POLARISATION ROTATOR WITH SMALL INDUCED ELLIPTICITY

(71) Applicant: Commissariat a l'energie atomique et aux ene alt, Paris (FR)

(72) Inventors: Umberto Rossini, Coublevie (FR); Maxime Favier, Bures sur Yvette (FR); Stephanie Le Calvez, Sassenage (FR); Sophie Morales, Varces (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/104,397

(22) Filed: Dec. 12, 2013

(65) Prior Publication Data

US 2014/0168550 A1 Jun. 19, 2014

(30) Foreign Application Priority Data

Dec. 13, 2012 (FR) ..................................... 12 62014

(51) Int. Cl.
*G02F 1/1335* (2006.01)
*G02F 1/13363* (2006.01)
*G02B 27/28* (2006.01)

(52) U.S. Cl.
CPC ...... *G02F 1/133528* (2013.01); *G02F 1/13363* (2013.01); *G02B 27/286* (2013.01); *G02F 2001/133541* (2013.01); *G02F 2001/133638* (2013.01)

(58) Field of Classification Search
USPC ........................................................ 349/18, 5
See application file for complete search history.

(56) References Cited

U.S. PATENT DOCUMENTS

| 2003/0089956 A1 | 5/2003 | Allen et al. | |
| 2011/0025966 A1* | 2/2011 | Sakai | 349/119 |
| 2012/0120349 A1 | 5/2012 | Sakai | |

FOREIGN PATENT DOCUMENTS

WO   WO 2013/092383 A1   6/2013

OTHER PUBLICATIONS

U.S. Appl. No. 14/324,379, filed Jul. 7, 2014, Le Prado, et al.
French Preliminary Search Report issued Aug. 12, 2013, in French Application No. 12 62014 filed Dec. 13, 2012 (with English Translation of Categories of Cited Documents).

(Continued)

*Primary Examiner* — Lucy Chien
(74) *Attorney, Agent, or Firm* — Oblon, McClelland, Maier & Neustadt, L.L.P.

(57) ABSTRACT

The invention relates to a polarization rotator with small polarization ellipticity. The rotator includes a first optical unit (401) and a second optical unit (402) on a common optical axis. The first optical unit (401) is formed by a rectilinear polarizer (205) and a first quarter-wave plate (210), where the polarization direction of the polarizer is a bisector of the neutral axes of the quarter-wave plate. The second optical unit (402) is formed by a variable-delay plate (220) and a second quarter-wave plate (230), where the neutral axes of the second quarter-wave plate are bisectors of the neutral variable-delay plate axes.

4 Claims, 6 Drawing Sheets

(56) References Cited

OTHER PUBLICATIONS

Search Report issued Feb. 4, 2014 in European Patent Application No. EP 13 19 6811 (with English translation of Category of Cited Documents) (references cited in the Search Report have been previously filed).

Ignacio Moreno, et al., "Two-dimensional polarization rotator using a twisted-nematic liquid-crystal display", XP-001504658, Feb. 20, 2007, vol. 46, No. 6, Applied Optics, pp. 881-887.

* cited by examiner

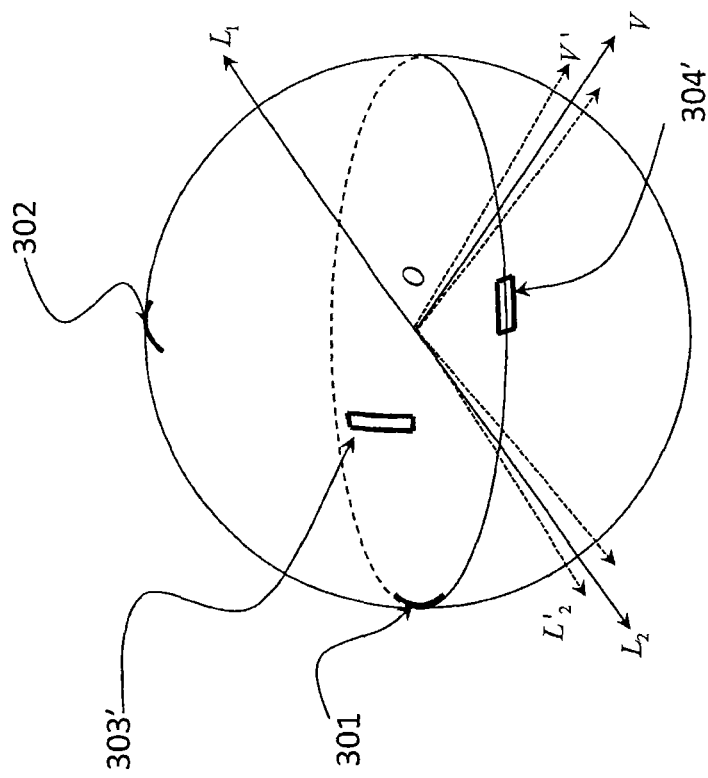
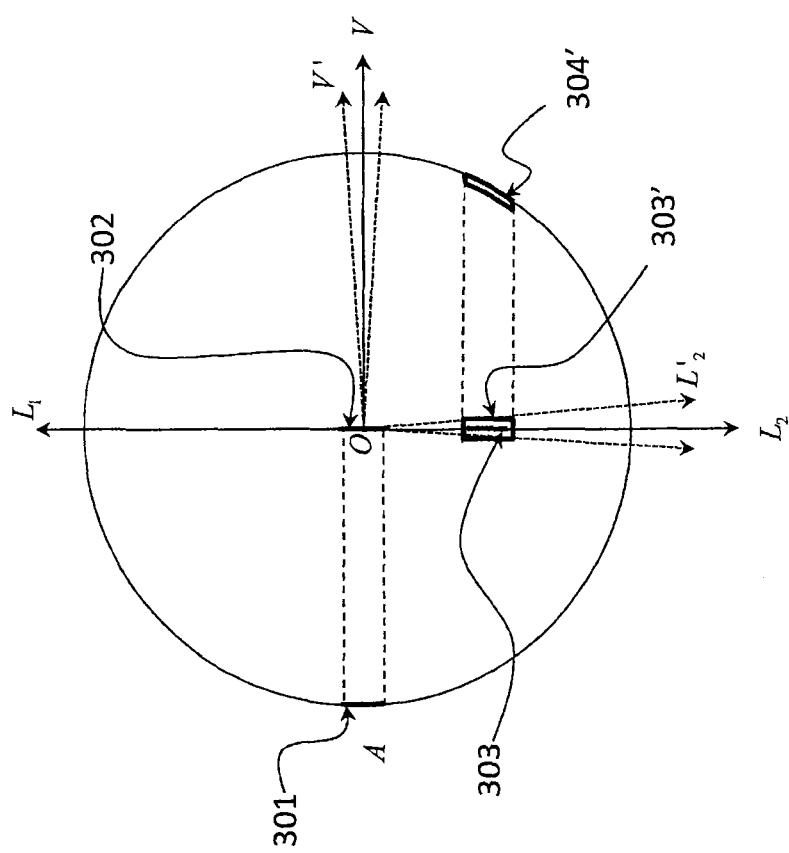
Fig. 6B
Fig. 6A

POLARISATION ROTATOR WITH SMALL INDUCED ELLIPTICITY

TECHNICAL FIELD

The present invention relates generally to polarisation rotators.

STATE OF THE PRIOR ART

Polarisation rotators are optical devices which enable the axes of an elliptical polarisation to be rotated, in particular the polarisation direction of a wave linearly polarised according to a predetermined angle of rotation.

Certain polarisation rotators have elements the angular alignment of which is controlled (for example, by means of a stepper motor), so as to be able to control the angle of rotation of the polarisation.

More recently liquid-crystal polarisation rotators have been proposed. These polarisation rotators have the advantage, in particular, that they contain no moving mechanical elements, and that they are easy to produce as miniaturised devices. They also have a small magnetic signature, and are therefore particularly suited for magnetometry.

A description of a liquid-crystal polarisation rotator will be found in the article by I. Moreno et al. entitled "Two-dimensional polarization rotator using a twisted-nematic liquid-crystal display", published in Applied Optics, vol. 46, No. 6, 20 Feb. 2007, pages 881-887.

The structure of this rotator has been illustrated in FIG. 1.

Polarisation rotator 100 includes a first quarter-wave plate 110, a liquid-crystal variable-delay plate 120 and a second quarter-wave plate 130.

These different elements are produced using a birefringent material and, for each element, the slow axis has been designated in the figure as s and the fast axis as f. The fast axis of the second quarter-wave plate coincides with the slow axis of the first in the slow axis of the second quarter-wave plate coincides with the fast axis of the first. The bisector of the neutral lines (i.e. of the slow and fast axes, also called below the neutral axes) of the variable-delay plate is aligned such that it is aligned with a neutral axis of the first and second quarter-wave plates.

It is recalled that with normal incidence a quarter-wave plate transforms a rectilinear polarisation incident wave into an elliptical polarisation wave, the axes of which are the neutral axes of this plate.

Due to its bisecting alignment, the variable-delay plate modifies the ellipticity of this polarisation without modifying the direction of its own axes. The second quarter-wave plate transforms the elliptically polarised wave from delay plate 120 into a linearly polarised output wave since the inherent axes of the polarisation coincide with its neutral axes.

The output wave thus has a rectilinear polarisation aligned in a direction which is rotated relative to the polarisation direction of the incident wave.

The principle of the polarisation rotator will be better understood by means of the Poincaré sphere illustrated in FIG. 2.

It is recalled that the equator of the Poincaré sphere, 200, represents the rectilinear polarisations and the poles represent the circular polarisations (right and left). All other points of the sphere correspond to elliptical polarisations. As one moves along a meridian of the sphere the eigen axes of the polarisation remain unchanged; only the ellipticity varies.

The effect of a birefringent element on a polarisation corresponds on the Poincaré sphere to a rotation around an axis connecting two diametrically opposite points of the sphere, where each represents a rectilinear polarisation along a neutral line (or neutral axis) of the element in question. The axis of rotation is noted $OL_1$ for the first quarter-wave plate, OV for the variable-delay plate and $OL_2$ for the second quarter-wave plate. It will be noted that, due to the alignment of the variable-delay plate in FIG. 1, straight line OV is orthogonal to straight line $L_1L_2$.

The polarisation of the incident wave has been represented on the Poincaré sphere by point A. This polarisation is in any direction (point A is located at any point of the equator). Point B corresponds to the polarisation at the output of the first quarter-wave plate. It is deduced from A by a rotation around axis $OL_1$ (arc of circle 251). Point C corresponds to the polarisation at the output of variable-delay plate 120. It is deduced from point B by a rotation around axis OV (arc of circle 252). The angle of rotation (or the length of the meridian arc) depends on the delay introduced by plate 120. Finally, point D corresponds to the polarisation at the output of the second quarter-wave plate. It is deduced from point C by a rotation around axis $OL_2$. It will be noted that the angle between straight lines OA and OD is equal to double the angle of rotation of the polarisation caused by the rotator.

The delay caused by the variable-delay plate, and therefore the polarisation rotation, is generally dependent on the voltage applied to the liquid-crystal cell and on the thickness of this plate.

The polarisation rotator of FIG. 1 however requires a strict angular alignment between the first quarter-wave plate and the variable-delay plate, firstly, and between this latter and the second quarter-wave plate, secondly. Indeed, since the bisector of the neutral axes of the variable-delay plate does not coincide with a neutral axis of the first or the second quarter-wave plate, it is observed that the polarisation at the output of the rotator (point D) is elliptical.

This sensitivity of the polarisation rotator to an angular positioning error of the variable-delay plate relative to the first and/or second quarter-wave plate will be better understood using FIG. 3A to 3C.

FIG. 3A shows a top view of the Poincare sphere of FIG. 2.

Axis of rotation $OL_1$ relative to the first quarter-wave plate, axis of rotation OV' relative to the variable-delay plate and axis $OL'_2$ relative to the second quarter-wave plate are represented in it.

For the sake of simplification, it has been supposed that only the first quarter-wave plate was misaligned by an angle $\epsilon$ relative to the variable-delay plate. This misalignment is reflected by an angular separation of $2\epsilon$ of axes OV' and $OL'_2$ relative to nominal axes OV and $OL_2$.

In addition, an angular variation of $\pm\delta$ from the polarisation direction of the incident wave is represented. The latter is reflected by an angular range 301 of straight line OA in the equatorial plane of the Poincaré sphere.

By a rotation of 90° around $OL_1$ angular range 301 is transformed into arc of a circle 302 aligned with the meridian of the sphere, the projection of which on the equator is merged with axis $OL_1$. It will be understood that arc 302 represents the polarisation range of the wave at the input of the variable-delay plate.

The action of the variable-delay plate on the polarisation of the wave is reflected by a rotation of arc 302 around axis OV'. This rotation gives an arc 303 which is no longer aligned with a meridian of the sphere, as may be seen in the perspective view of FIG. 3B.

Finally, the action of the second quarter-wave plate is reflected by a rotation of 90° around axis $OL'_2$ in the direction opposite the rotation around axis $OL_1$. The latter transforms the arc of this circle 303 into an arc of a circle 304 extending either side of the equatorial plane. As a result the polarisation of the wave at the output of the rotator may have a non-negligible degree of ellipticity.

In the same way, a misalignment of the second quarter-wave plate relative to the variable-delay plate may be reflected by an elliptical polarisation at the output of the rotator.

The criticality of a misalignment on the residual ellipticity requires that the three elements of the polarisation rotator are aligned on an optical bench.

The aim of the present invention is to propose a polarisation rotator devoid of the above disadvantages, i.e. one which is sufficiently tolerant of the angular positioning errors between its constituent elements, and the output of which has small polarisation ellipticity.

DESCRIPTION OF THE INVENTION

The present invention is defined by a polarisation rotator, including, along a common optical axis:

a first optical unit including a rectilinear polariser and a first quarter-wave plate, which are aligned in fixed fashion relative to one another, where the polarisation direction of the said polariser is a bisector of the neutral axes of the quarter-wave plate;

a second optical unit including a variable-delay plate formed by a liquid-crystal plate, and a second quarter-wave plate, which are aligned in fixed fashion relative to one another, where the neutral axes of the second quarter-wave plate are bisectors of the neutral axes of the variable-delay plate.

The relative alignment of the first and second optical units, around the common optical axis, may advantageously be adjusted, and adjusted such that the slow and fast axes of the first quarter-wave plate coincide respectively with the fast and slow axes of the second quarter-wave plate.

The variable-delay plate is preferably a liquid-crystal plate, and in particular a nematic liquid-crystal plate.

BRIEF DESCRIPTION OF THE ILLUSTRATIONS

Other characteristics and advantages of the invention will appear on reading the preferential embodiments of the invention made in reference to the attached figures, among which:

FIG. 1, previously described, represents schematically a liquid-crystal polarisation rotator known from the state of the art;

FIG. 2, previously described, represents on the Poincare sphere the polarisation of a wave at different points of the optical axis of the polarisation rotator of FIG. 1;

FIGS. 3A and 3B, previously described, illustrate the effect of an angular positioning error on the polarisation at the output of the polarisation rotator of FIG. 1;

FIGS. 6A and 6B illustrate the effect of an angular positioning error of a quarter-wave plate on the polarisation at the output of the polarisation rotator of FIG. 4.

DETAILED DESCRIPTION OF PARTICULAR EMBODIMENTS

The idea underlying the present invention is to divide the polarisation rotator into two optical units, a first unit consisting of a polariser and a first quarter-wave plate, and a second unit consisting of a variable-delay plate and a second quarter-wave plate. The polariser is aligned such that the polarisation direction corresponds to the bisector of the neutral axes of the first quarter-wave plate. In the case of a perfect alignment, where the polarisation at the output of the first quarter-wave plate is circular, the alignment of the first quarter-wave plate relative to the variable-delay plate thus becomes unimportant.

Figure 4:
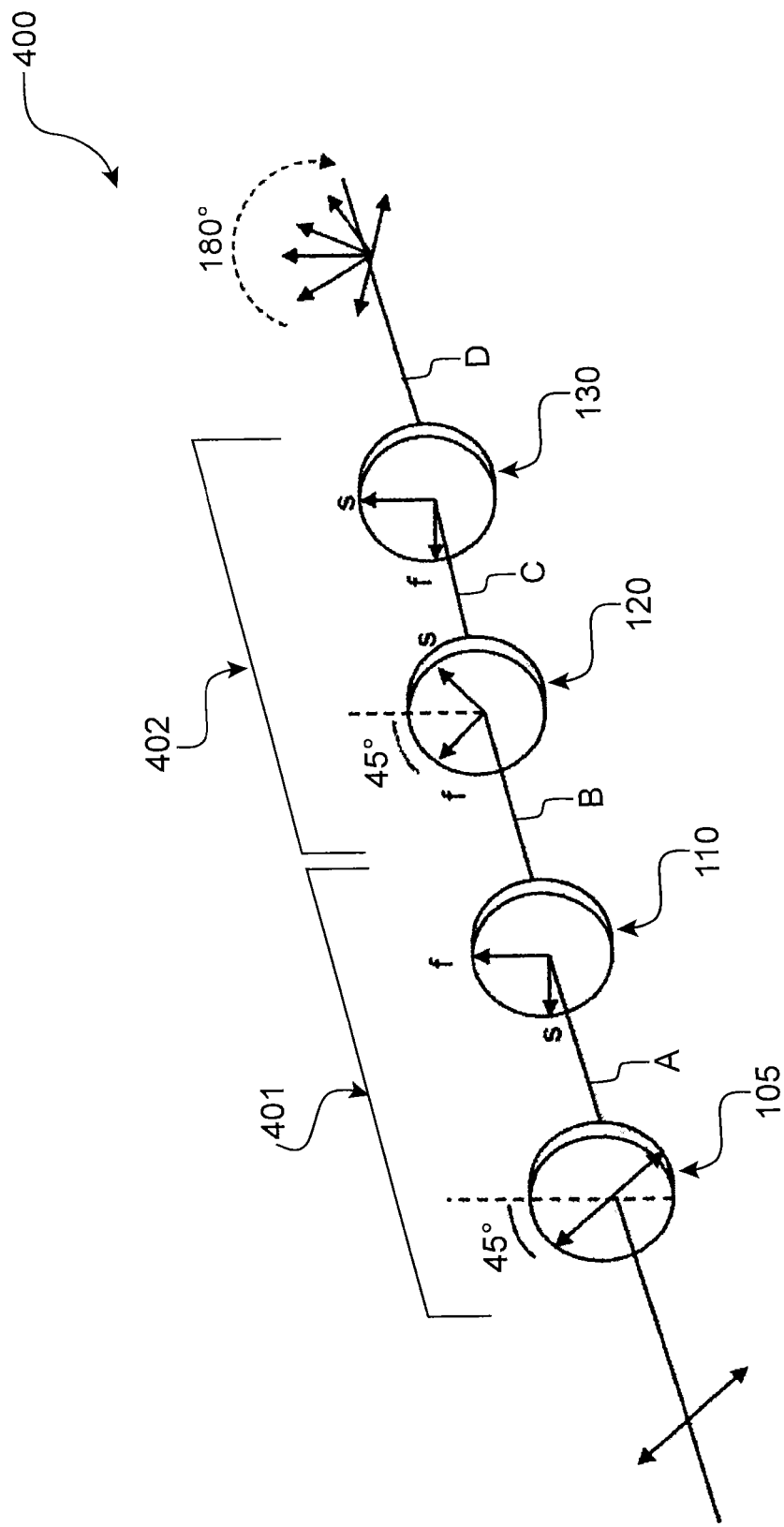
FIG. 4 represents schematically a polarisation rotator according to one embodiment of the invention.

FIG. 4 represents a liquid-crystal polarisation rotator according to one embodiment of the invention. The optical elements identical to those of FIG. 1 have the same reference numbers.

Figure 1:
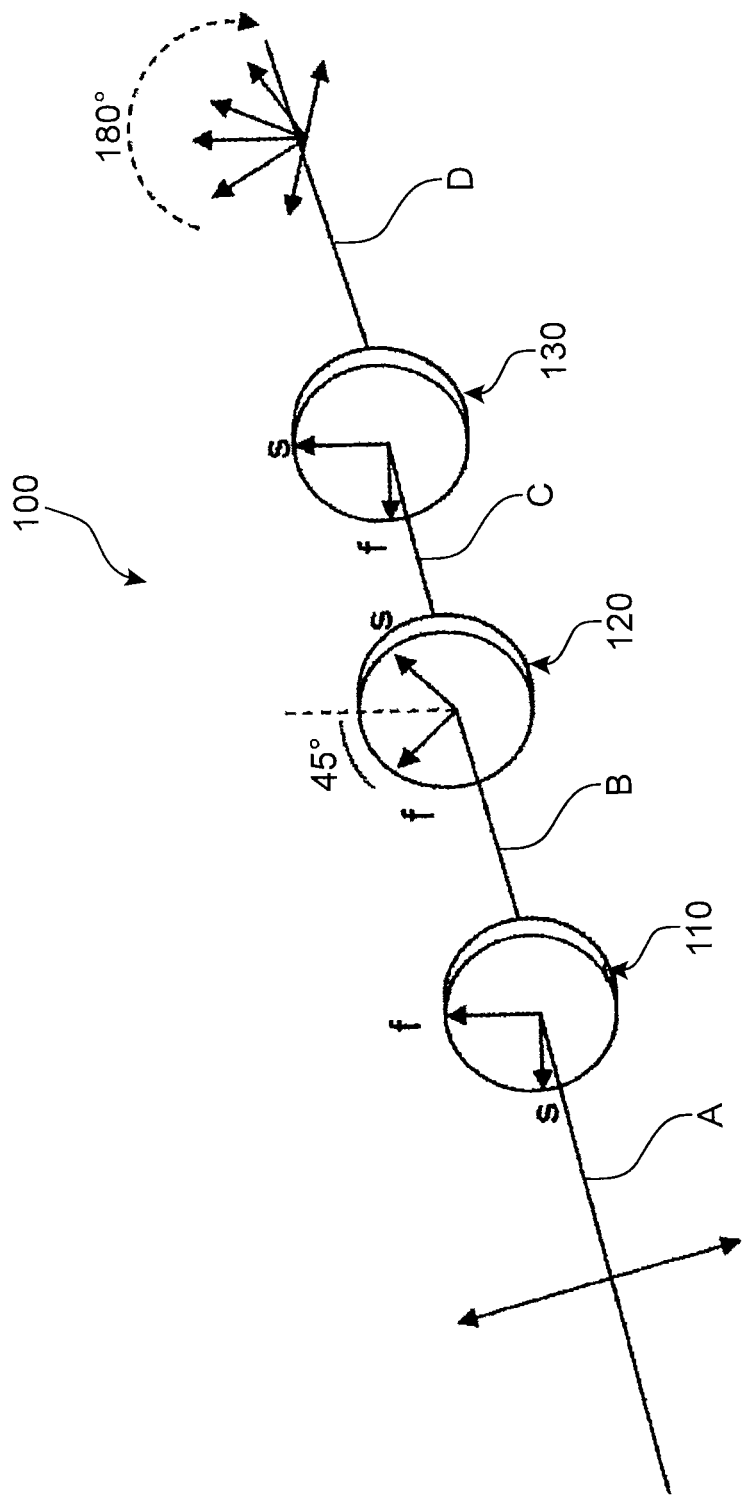
Figure 2:
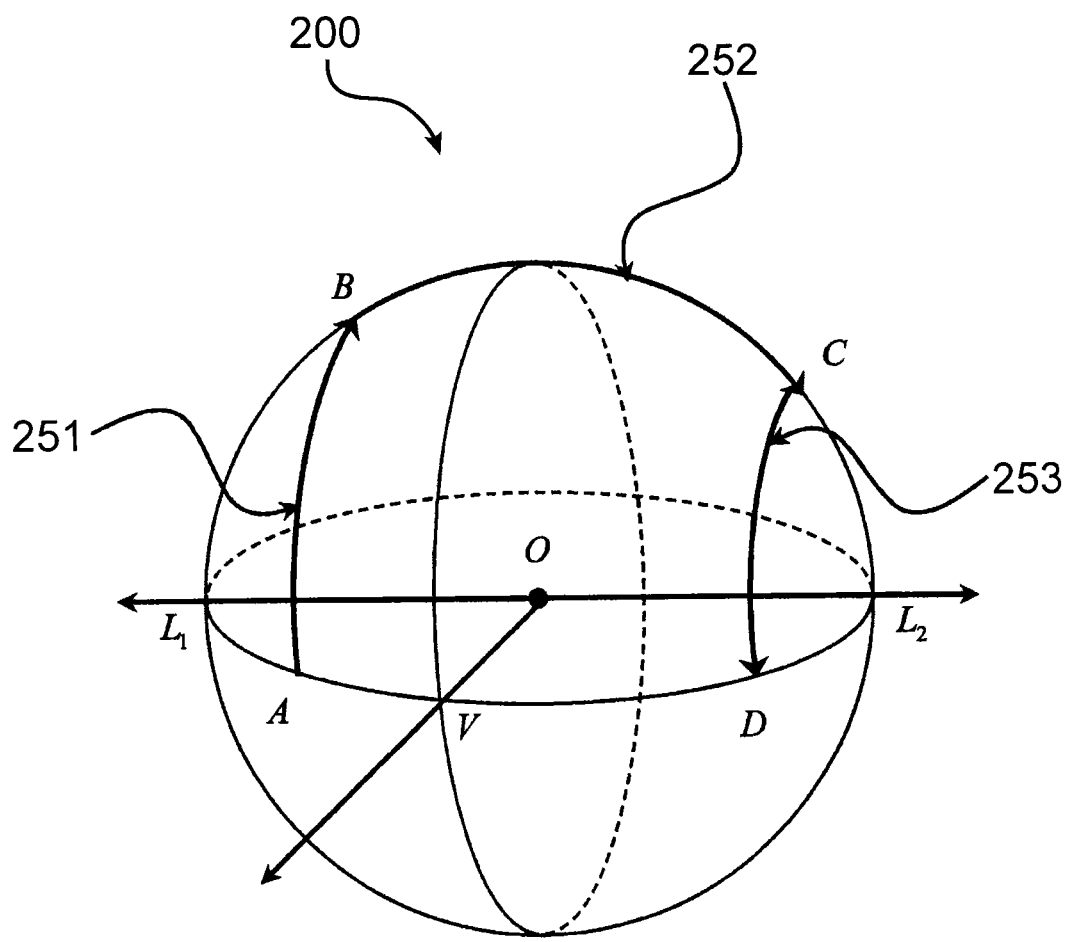
Figure 3A:
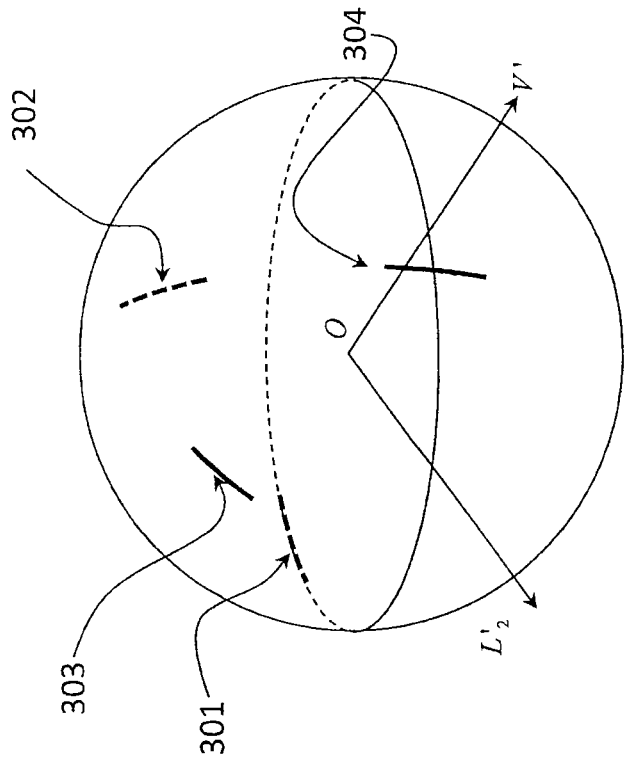
Figure 3B:
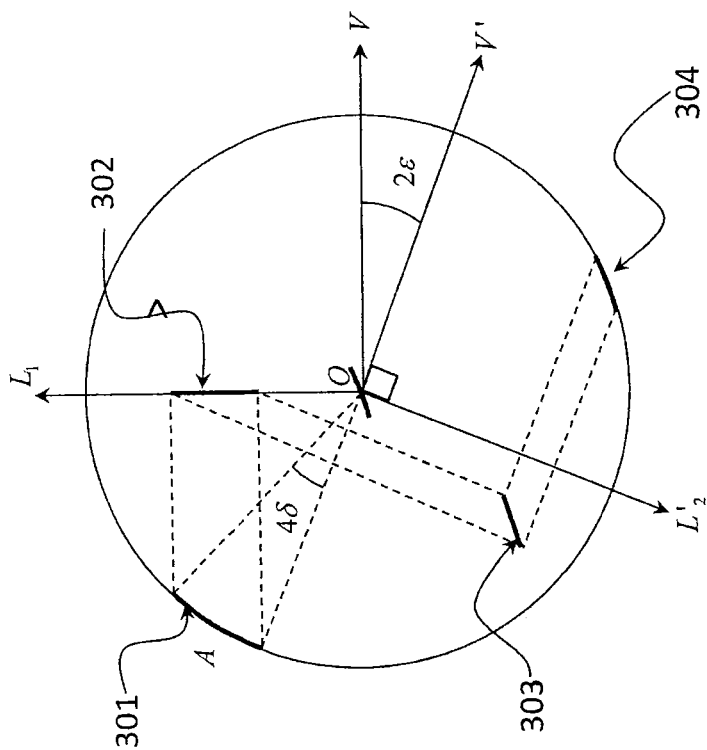

This rotator, 400, is distinguished firstly from that of FIG. 1 by the presence of a rectilinear polariser 105 before the first quarter-wave plate, 110.

As previously mentioned, polariser 105 and first quarter-wave plate 110 form a first optical unit 401. Similarly, variable-delay plate, 120, and second quarter-wave plate 130 form a second optical unit, 402. The term "optical unit" is understood to mean an assembly of optical elements the relative alignment of which around the common optical axis is fixed, for example by means of a mechanical connection between these elements.

The polarisation direction of polariser 105 is aligned such that it coincides with the bisector of the fast and slow axes (neutral axes) of first quarter-wave plate 110. This configuration has two advantages. Firstly, since the polarisation at the output of the first quarter-wave plate is circular, the second optical unit (in particular variable-delay plate 120) may be aligned in any manner relative to the first optical unit.

Secondly, the first optical unit acts as an optical isolator. Indeed, a reflection after the first quarter-wave plate (for example on the backward-facing face of variable-delay plate 120) leads to a reflected wave, which is polarised in circular fashion, propagating in the reverse direction of the incident wave, a reflected wave which is transformed by this same plate into a rectilinear polarisation wave having a polarisation direction orthogonal to that of the polariser.

Within the second optical unit, second quarter-wave plate, 130, is installed such that each of its neutral axes (fast and slow) is a bisector of the neutral axes of variable-delay plate 120.

The variable-delay plate is preferably a liquid-crystal plate, for example a nematic liquid-crystal plate.

Figure 5:
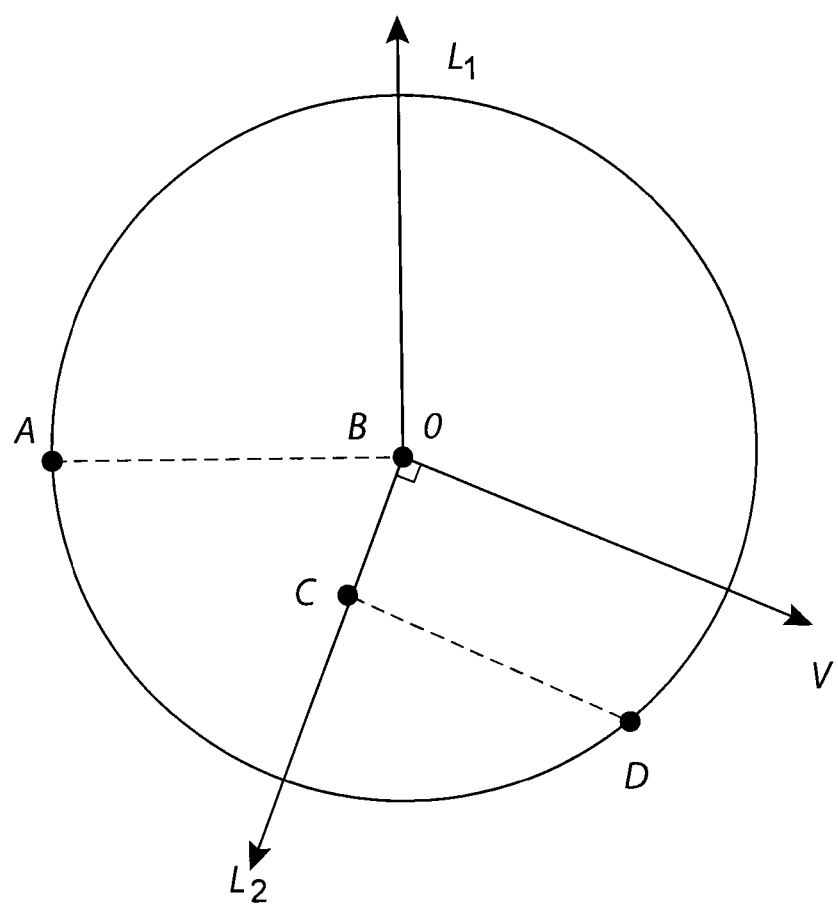
FIG. 5 represents on the Poincare sphere the polarisation of a wave at different points of the optical axis of the polarisation rotator of FIG. 3.

The FIG. 5 represents the polarisation of the wave at different points along the axis of the polarisation rotator.

The Poincaré sphere is represented here seen from above. The polarisation of the wave at the output of polariser 105 is represented by point A. Axis OA forms an angle of 90° with axis of rotation $OL_1$ since the polarisation direction at the output of the polariser is 45° relative to the neutral axes of the first quarter-wave plate. This angle is fixed due to the fact that the polariser and the first quarter-wave plate belong to the same optical unit.

After a 90° rotation around axis of rotation $OL_1$, point B, representing the polarisation, coincides with the north pole of the sphere (circular polarisation).

This point is then rotated around axis OV. Point C, which is transformed from B by this rotation, corresponds to the polarisation of the wave output by the variable-delay plate.

Finally, the action of the second quarter-wave plate is reflected by a rotation around axis $OL_2$, which is orthogonal to OV. The resulting point, D, is located on the equator of the Poincaré sphere. The angle formed between axes OA and OD is equal to twice the rotation of the polarisation.

The tolerance of this polarisation rotator of angular positioning errors will be illustrated by means of FIGS. 6A and 6B.

FIG. 6A shows a top view of the Poincare sphere. An angular range 301 of straight line OA in the equatorial plane of the sphere corresponding to a possible error of the alignment of the input polariser relative to the first quarter-wave plate within the first optical unit is represented once again. This alignment error is small since it is the uncertainty of the angular position of these two elements in the first optical unit at installation.

As mentioned in FIG. 6A, the rotation around axis $OL_1$ transforms angular range 301 into an arc of a circle 302, of small angular amplitude, centred on the north pole, and the projection of which on to the equatorial plane is aligned with axis $OL_1$.

The variable-delay plate causes this arc of a circle to rotate around axis OV to give an arc of a circle 303.

When the first and second optical units are aligned such that the slow axis of the first quarter-wave plate corresponds to the fast axis of the second quarter-wave plate (and vice versa), axis OV is orthogonal to axis $OL_1$. As a result arc 303 is perfectly aligned with the meridian, the projection of which on the equatorial plane coincides with axes $OL_1$ and $OL_2$. The rotation of arc 303 around axis $OL_2$ gives an arc of a circle 304 aligned with the equator or, in other words, the polarisation ellipticity at the output is zero.

FIG. 6B shows a perspective view of the Poincaré sphere. Axes $OL_1$, OV and $OL_2$, angular range 301 corresponding to the positioning error within the first optical unit, and also arc 302 defined above, are shown in this figure.

When the first and second optical units are not aligned (misalignment of ±δ of axes OV and $OL_2$, indicated by a dashed line in FIGS. 6B and 6C) the rotation around OV leads to a zone 303' centred around meridian M, transformed by rotation around $OL_2$ into a zone 304' centred around the equator. When both optical units are perfectly aligned, zones 303' and 304' are merged respectively with arcs 303 and 304.

The ellipticity of the wave at the output of the polarisation rotator is thus only slightly affected by an angular misalignment between the two optical units. It is also understood that the effect of this angular misalignment on the polarisation ellipticity is even smaller since the alignment within the first and second optical units is more accurate. In any event, as a result of the quasi-circular polarisation at the output of the first optical unit, the effect of such a misalignment on the polarisation ellipticity at the output of the rotator is a second-order effect compared to that observed in the state of the art.

In addition, if the first unit has an alignment fault, but both optical units are aligned, the error on the polarisation ellipticity at the output of the rotator is also a second-order error compared to that observed in the state of the art. The assembly accuracy of the first optical unit is thus relaxed. Ultimately the only important element is the assembly accuracy of the second optical unit.

The invention claimed is:

1. A polarisation rotator, comprising, along a common optical axis:
    a first optical unit including a rectilinear polariser and a first quarter-wave plate, which are aligned in fixed fashion relative to one another, where the polarisation direction of said polariser is a bisector of the neutral axes of the quarter-wave plate;
    a second optical unit including a variable-delay plate formed by a liquid-crystal plate, and a second quarter-wave plate, which are aligned in fixed fashion relative to one another, where the neutral axes of the second quarter-wave plate are bisectors of the neutral axes of the variable-delay plate.

2. A polarisation rotator according to claim 1, wherein the relative alignment of the first and second optical units around the common optical axis may be adjusted, and adjusted such that the slow and fast axes of the first quarter-wave plate coincide respectively with the fast and slow axes of the second quarter-wave plate.

3. A polarisation rotator according to claim 1, wherein the variable-delay plate is a liquid-crystal plate.

4. A polarisation rotator according to claim 3, wherein the liquid crystal is a nematic liquid crystal.

* * * * *